(12) United States Patent
Abdelhamed et al.

(10) Patent No.: US 10,375,072 B2
(45) Date of Patent: Aug. 6, 2019

(54) DASHBOARD AS REMOTE COMPUTING SERVICES

(71) Applicant: Microsoft Technology Licensing, LLC, Redmond, WA (US)

(72) Inventors: Adam Abdelhamed, Duvall, WA (US); Leon Welicki, Issaquah, WA (US); Brad Olenick, Kirkland, WA (US); Mo Wang, Seattle, WA (US); Christopher Scrosati, Seattle, WA (US); Josh Keckley, Redmond, WA (US); Jon Harris, Issaquah, WA (US); Khetthai Laksanakorn, Nonthaburi (TH)

(73) Assignee: Microsoft Technology Licensing, LLC, Redmond, WA (US)

( * ) Notice: Subject to any disclaimer, the term of this patent is extended or adjusted under 35 U.S.C. 154(b) by 145 days.

(21) Appl. No.: 15/048,715

(22) Filed: Feb. 19, 2016

(65) Prior Publication Data
US 2017/0134381 A1   May 11, 2017

Related U.S. Application Data

(60) Provisional application No. 62/252,988, filed on Nov. 9, 2015.

(51) Int. Cl.
| H04L 29/06 | (2006.01) |
| G06F 9/451 | (2018.01) |
| G06F 3/0484 | (2013.01) |

(52) U.S. Cl.
CPC .............. *H04L 63/10* (2013.01); *G06F 9/451* (2018.02); *G06F 9/452* (2018.02); *G06F 3/04847* (2013.01)

(58) Field of Classification Search
CPC ..... H04L 63/10; G06F 9/4443; G06F 9/4445; G06F 9/451; G06F 9/452
See application file for complete search history.

(56) References Cited

U.S. PATENT DOCUMENTS

| 7,895,234 B2 | 2/2011 | Lillie et al. |
| 2006/0036595 A1 | 2/2006 | Gilfix et al. |

(Continued)

FOREIGN PATENT DOCUMENTS

WO    WO2014165967    * 10/2014    ............. G06Q 30/04

OTHER PUBLICATIONS

"Using Dashboards", Published on: Jan. 22, 2015 Available at: http://www.cisco.com/c/en/us/td/docs/security/firesight/541/user-guide/FireSIGHT-System-UserGuide-v5401/Dashboard.html.

(Continued)

*Primary Examiner* — Noura Zoubair
(74) *Attorney, Agent, or Firm* — Liang IP, PLLC (57) ABSTRACT

Various techniques for implementing computer dashboards as cloud-based services are disclosed herein. In one embodiment, a method includes receiving a dashboard file at a server via a computer network, the dashboard file identifying a dashboard having one or more graphical user interface elements individually configured to display and dynamically update data associated with a cloud-based service. The dashboard file further contains metadata indicating a cloud-based subscription. The method also includes associating the received dashboard file with the cloud-based subscription, identifying one or more entities allowed to access the dashboard based on the cloud-based subscription, and displaying, via the computer network, the dashboard identified by the dashboard file to the one or more entities upon verification of the cloud-based subscription.

19 Claims, 9 Drawing Sheets

(56) References Cited

U.S. PATENT DOCUMENTS

| | | |
|---|---|---|
| 2010/0198649 A1 | 8/2010 | Appleyard et al. |
| 2013/0066945 A1* | 3/2013 | Das .................. G06F 15/16 709/203 |
| 2013/0132861 A1 | 5/2013 | Kienzle et al. |
| 2014/0188459 A1 | 7/2014 | Fink et al. |
| 2015/0058092 A1 | 2/2015 | Rea et al. |
| 2015/0180941 A1 | 6/2015 | Yang et al. |
| 2015/0188927 A1* | 7/2015 | Santhi .................. H04L 63/104 726/4 |
| 2015/0332200 A1 | 11/2015 | Bernaudin et al. |

OTHER PUBLICATIONS

"Sharing your Dashboard", Retrieved on: Nov. 23, 2015 Available at: https://support.qualtrics.com/vocalize/dashboard-tab/dashboards/sharing-your-dashboard.

"Deploy Operations Dashboard to Portal for ArcGIS", Published on: May 10, 2015 Available at: http://server.arcgis.com/en/portal/latest/administer/linux/portal-deploy.htm.

"Microsoft Dynamics CRM Dashboards", Retrieved on: Nov. 23, 2015 Available at: http://crmbook.powerobjects.com/basics/analytics/dashboards/#share_dashboard.

"Share a Report or Dashboard by Role", Retrieved on: Nov. 23, 2015 Available at: https://help.salesforce.com/HTViewHelpDoc?id=analytics_share_folder_with_role.htm&language=en_US.

"Share Dashboards", Published on: Mar. 21, 2015 Available at: https://support.google.com/analytics/answer/1069386?hl=en.

Key, et al., "VizDeck: Self-Organizing Dashboards for Visual Analytics", In Proceedings of the ACM SIGMOD International Conference on Management of Data, May 20, 2012, pp. 681-684.

Ruby, Daniel, "Now Share Stackdriver Charts, Clone Custom Dashboards", Published on: Jan. 30, 2014 Available at: http://www.stackdriver.com/now-share-stackdriver-charts-clone-custom-dashboards/.

"Creating a Dashboard Using Data from a Saved File", Retrieved on: Nov. 23, 2015 Available at: http://www2.microstrategy.com/producthelp/Express/WebUser/WebHelp/Lang_1033/index.html#page/Express/Uploading_Data.03.04.html.

"Importing Klips, Dashboards, and Data Sources", Retrieved on: Nov. 23, 2015 Available at: https://klipfolio.uservoice.com/knowledgebase/articles/157175-importing-klips-dashboards-and-data-sources.

"Second Written Opinion Issued in PCT Application No. PCT/US2016/060213", dated May 4, 2017, 6 Pages (MS# 358841-WO-PCT).

"International Preliminary Report on Patentability Issued in PCT Application No. PCT/US2016/060213", dated Jul. 31, 2017, 7 Pages (MS# 358841-WO-PCT).

"International Search Report and Written Opinion Issued in PCT Application No. PCT/US2016/060213", dated Feb. 24, 2017, 11 Pages. (MS# 358841-WO-PCT).

* cited by examiner

DASHBOARD AS REMOTE COMPUTING SERVICES

CROSS-REFERENCE TO RELATED APPLICATION(S)

This application claims priority to U.S. Provisional Application No. 62/252,988, filed on Nov. 9, 2015.

BACKGROUND

In information technology, a computer dashboard typically refers to a computer program having a graphical user interface ("GUI") that organizes and presents various types of administrative or operational information in a unified display. For example, a computer dashboard can obtain information from an operating system and applications running on a computer and/or from one or more applications or services deployed in remote servers. The computer dashboard can then present the obtained information as a collection of information on a graphical user interface as, for instance, tables, graphs, or other representations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In conventional cloud-based computing systems, a user can subscribe to one or more cloud-based services (e.g., virtual machines, storage services, etc.) via a network portal. When the user logs into the network portal, the cloud-based computing system provisions a corresponding dashboard that shows operating data of services subscribed by the user or other suitable information related to the user's subscription. The user can customize the displayed information in the dashboard to suit particular needs. However, the customized dashboard is private to the user and can only be accessed by the user via the portal. As such, the user cannot share the customized dashboard with any other users.

Several embodiments of the disclosed technology are directed to techniques that implement computer dashboards as cloud-based services. As such, a user who publishes a dashboard can share the published dashboard with other users as a cloud-based service. In certain implementations, the shared dashboard can also be configured to enforce access control. For example, access control can be configured to allow only the original publishing user to edit the shared dashboard while allowing other users to only view the shared dashboard. In another example, the access control can also be configured to allow the other users to only see some but all of the displayed information in the shared dashboard. In further examples, access control can be configured to allow the other users full control of the shared dashboard.

In other implementations, a dashboard can be integrated into a deployment package with other cloud-based applications and/or services. The dashboard included in the deployment package can be pre-configured to monitor and present information associated with the associated applications and/or services included in the package. As such, by sharing the dashboard with administrators, developers, or other suitable users, operational data related to the deployed applications and/or services can be efficiently conveyed to appropriate users.

In further implementations, one or more dashboards can be individually associated with a tag, a flag, a descriptor, or other suitable types of metadata. For example, one or more dashboards can be associated with a tag, e.g., "human resources." As such, when a user selects the tag "human resources," the computing system can present the one or more dashboards identified by this tag to the user. As such, the user can efficiently navigate through the multiple available dashboards of interests.

In yet other implementations, a published dashboard can receive unattended upgrades. For example, a first user can publish a dashboard and shares the dashboard with a second user, who is allowed to view but not edit the published dashboard. After publication, the first user can revise or modify the published dashboard, for example, by organizing displayed information. Once the first user accepts all the revisions, the computing system can automatically upgrade the published dashboard to the new version with all the revisions by the first user without any input from the second user. As such, the second user can access the upgraded dashboard without any effort to upgrade by the second user.

In yet further implementations, a user can publish, modify, or otherwise manipulate a dashboard programmably without accessing the portal. As such, external programming applications (e.g., Microsoft Visual Studio®) can be configured to allow a user to develop or configure a dashboard and publish the configured dashboard directly to the cloud computing system. External programming applications can also allow the user to revise or modify the published dashboard subsequent to publication programmably.

DETAILED DESCRIPTION

Certain embodiments of computing systems, devices, components, modules, routines, and processes for implementing computer dashboards as remote computing services are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1A-5.

As used herein, a "dashboard" or "computer dashboard" generally refers to a computer program that (i) allows assembly of information from various cloud-based applications and/or services and (ii) presents the assembled information in one or more GUI elements in a structured manner. For example, in certain embodiments, a dashboard can include a computer program configured to collect operating conditions, results, or other operating data of one or more applications and/or services deployed in remote servers and dynamically presenting and/or updating one or more corresponding tiles to display the collected operating data.

Also used herein, the term "computing system" generally refers to an interconnected computer network having a plurality of network nodes that connect a plurality of hosts to one another or to external networks (e.g., the Internet). The term "network node" generally refers to a network device. Example network nodes include routers, switches, hubs, bridges, load balancers, security gateways, or firewalls. A "host" generally refers to a physical computing device configured to implement, for instance, one or more virtualized computing devices or components, or other suitable functionalities. In certain embodiments, a host can include a server having a hypervisor configured to support one or more virtual machines or other suitable virtual components. In other embodiments, a host can include a network storage device, a network management controller, or other suitable types of devices.

As used herein, a "portal" or "network portal" general refers to a network site that acts as a starting point for a user to access subscribed cloud-based services. For instance, a portal can include a website configured to receive a user's identification information (e.g., passwords), to authenticate the received identification information, and in response to a successful authentication, to direct the user to desired webpages such as a dashboard associated with user subscribed cloud computing services. The webpages can provide the user with information regarding, for instance, service subscriptions, account information, billing information, operating status of subscribed services, or other suitable information. Portals can be local network based or web based. One example web-based portal is the Microsoft Azure® portal provided by Microsoft Corporation of Redmond, Wash.

In conventional cloud-based computing systems, a user can subscribe to one or more cloud-based services (e.g., virtual machines, storage services, etc.) provided by a cloud-based computing system via a web-based portal such as the Microsoft Azure® portal. When the user logs into the web-based portal, the cloud-based computing system provisions a corresponding private dashboard that shows operating data or other suitable information related to services subscribed by the user. The user can customize and modify the displayed dashboard to suit particular needs. However, the customized dashboard is private to the user, and the user may not share the customized dashboard with any other users. Thus, other users who desire similar information have to individually configure separate dashboards, resulting in duplication of efforts and costs.

Several embodiments of the disclosed technology are directed to techniques that implement computer dashboards as cloud-based services. As such, a user can publish a dashboard and share the published dashboard with other users as a cloud-based service. In certain implementations, the shared dashboard can also be configured to enforce access control. For example, the access control may only allow the original publishing user to edit the shared dashboard. In another example, the access control may only allow the other users to see some but all of the displayed information in the published dashboard. In further examples, the access control may allow the other users full control of the published dashboard. As such, several embodiments of the disclosed technology can reduce duplication of efforts and costs, as described in more detail below with reference to FIGS. 1A-5.

Figure 1:
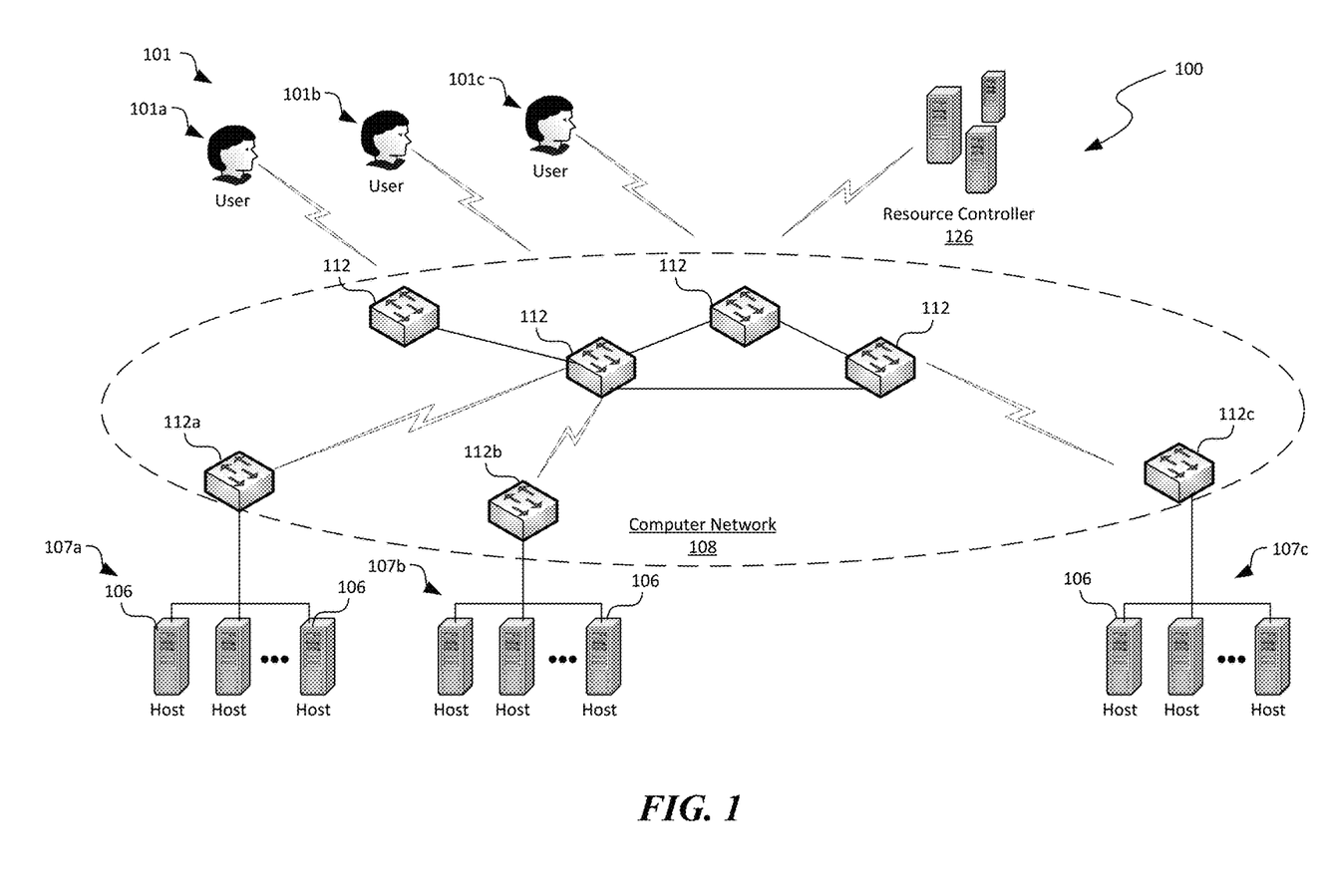
FIG. 1 is a schematic diagram of a computing system suitable for implementing dashboard as services in accordance with embodiments of the disclosed technology.

FIG. 1 is a schematic diagram illustrating a computing system 100 suitable for implementing dashboards as services in accordance with embodiments of the disclosed technology. As shown in FIG. 1, the computing system 100 can include a computer network 108 interconnecting a plurality of hosts 106, a plurality of users 101, and a resource controller 126. Even though particular components of the computing network 100 are shown in FIG. 1A, in other embodiments, the computing network 100 can also include additional and/or different components. For example, in certain embodiments, the computing network 100 can also include network storage devices, maintenance managers, and/or other suitable components (not shown).

As shown in FIG. 1A, the computer network 108 can include one or more network nodes 112 that interconnect the multiple hosts 106, the users 101, and the resource controller 126. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively. The network nodes 112a-112c are operatively coupled to additional network nodes 112 to form a network in a hierarchical, flat, mesh, or other suitable types of topology. The computer network 108 can thus allow communications among the hosts 106, the resource controller 126, and the users 101. In other embodiments, multiple host sets 107a-107c may share a single network node 112.

The hosts 106 can individually be configured to provide computing, storage, and/or other suitable cloud computing services to the users 101. For example, one of the hosts 106 can initiate and maintain one or more virtual machines (not shown) upon requests from the users 101. The users 101 can then utilize the initiated virtual machines to perform computation, communication, and/or other suitable tasks. In another example, the initiated virtual machine can also facilitate a user 101 to edit, publish, or otherwise manipulate a dashboard. In certain embodiments, one of the hosts 106 can provide virtual machines for the users 101. In other embodiments, multiple hosts 106 can provide virtual machines or other suitable services to multiple users 101.

In accordance with several embodiments of the disclosed technology, the resource controller 126 can be configured to provide a portal to the users 101. The portal can allow the users 101 to manage service subscriptions, request desired cloud-based services, and/or perform other suitable operations. In particular, in certain embodiments, the resource controller 126 can be configured to allow the users 101 to manage publication, access, revision, upgrade, and other operations related to one or more dashboards. In the illustrated embodiment, the resource controller 126 is shown as a standalone server, desktop computer, laptop computer, or other suitable types of computing device operatively coupled to the computer network 108. In other embodiments, the resource controller 126 can include one of the hosts 106. In further embodiments, the resource controller 126 can be implemented as one or more network services executing on and provided by, for example, one or more of the hosts 106. Example components and operations of the resource controller 126 are described in more detail below with reference to FIG. 1B.

In operation, the computing system 100 can provide a portal to a user 101 when the user 101 accesses an associated website (e.g., https://portal.azure.com/) via, for instance, a web browser on a client device (not shown). The portal can include a basic login webpage that accepts a user name, a password, or other suitable types of credentials. The computing system 100 can then authenticate the received credentials, or instance, using a security server. In response to a successful authentication, the computing system 100 can provide facilities to publish, edit, configure access control, and/or perform other operations on one or more dashboard, as described in more detail below with reference to FIG. 1B.

Figure 2A:
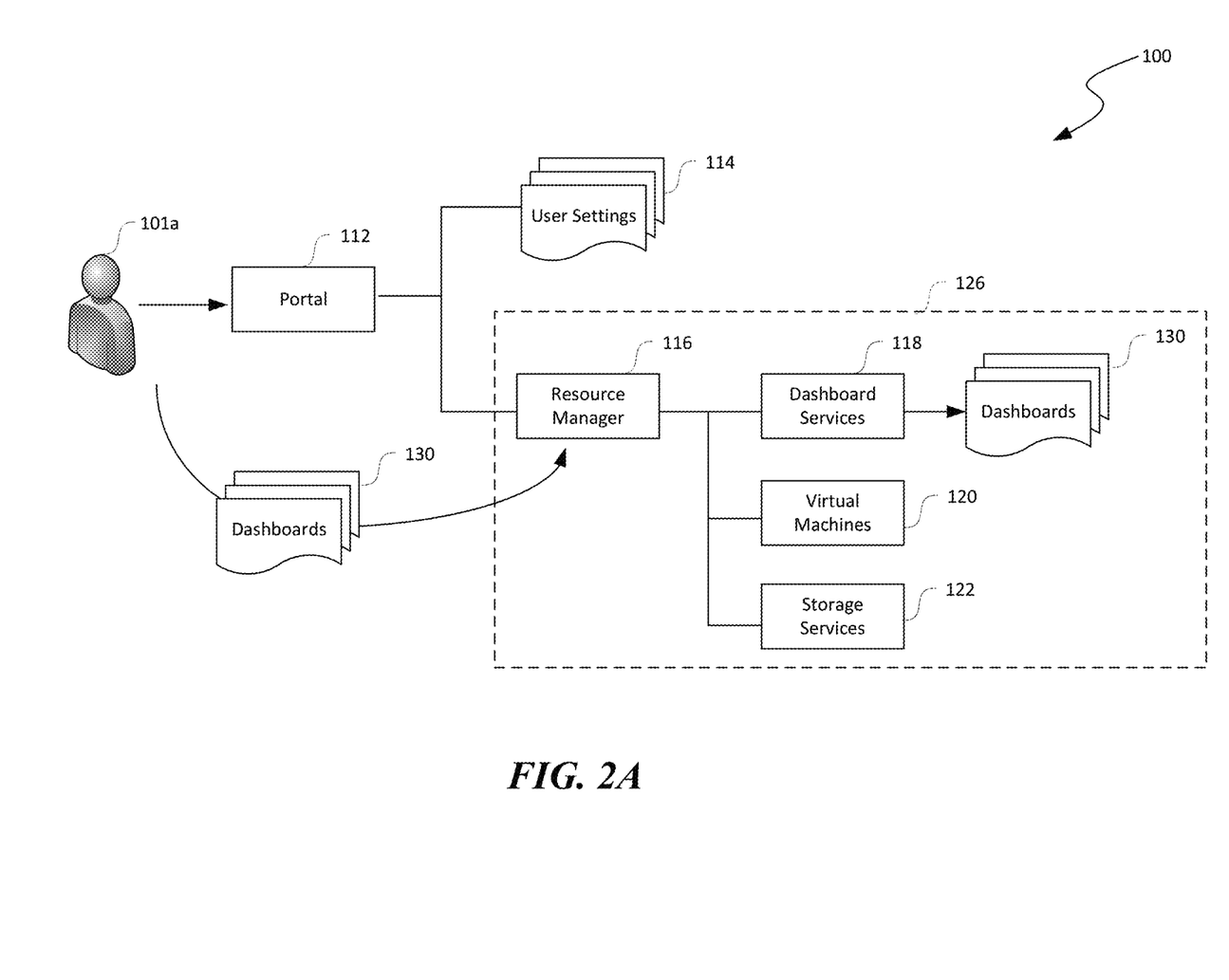
FIG. 2A is a schematic diagram showing example software components of the computing system in FIG. 1 during publication of a dashboard in accordance with embodiments of the disclosed technology.

FIG. 2A is a schematic diagram showing example software components of the computing system 100 in FIG. 1 during publication of a dashboard in accordance with embodiments of the disclosed technology. In FIG. 2A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the computing system 100 can include a portal 112 operatively coupled to one or more records of user settings 114 and a resource manager 116. The portal 112 can be configured to allow a first user 101a access to cloud-based applications and/or services provided by the computing system 100. For example, in one embodiment, the portal 112 can include functionalities such as user identification verification, links to subscribed resources, and/or other suitable functionalities. The user settings 114 can include one or more data files configured to store user preferences. For example, in one embodiment, the user settings 114 can include user selections of display profiles, update frequencies, etc. In certain embodiments, the user settings 114 can include one or more private dashboards (not shown) associated with the first user 101a. In other embodiments, the user settings 114 can include other suitable information and/or data.

As shown in FIG. 2A, the resource controller 126 can include a resource manager 116 operatively coupled to the portal 112. The resource manager 116 can be configured to allow the first user 101a to access and/or manage various resources available and/or subscribed by the first user 101a. For example, in the illustrated embodiment, the resource manager 116 can allow the user 101 access of various cloud-based services such as a dashboard services 108, virtual machines 110, and storage services 112. In certain embodiments, the resource manager 116 can also allow configuration and enforcement of access controls. In other embodiments, access controls may be implemented at the dashboard services 118, virtual machines 120, storage services 122, or other suitable services.

The dashboard services 118 can be configured to allow the user 101 to publish, share, and access dashboards 120 based on access controls. For example, in one embodiment, the first user 101a can create a subscription with the resource manager 116 via the portal 112. The first user 101a can then publish one or more dashboards 130 to the subscription as dashboard services 118. The dashboard 130 can be stored locally on the resource controller 126, at a network storage device of the computing system 100, or in other suitable storage locations. Example files of the individual dashboards 130 are described in more detail below with reference to FIGS. 2A and 2B.

In certain embodiments, the first user 101a can configured access control applicable to one or more of the published dashboard 130. For example, in one embodiment, access control can be configured to allow access to only a portion of the displayed information on the individual dashboards 130. In another embodiment, access control can be configured to allow other users 101 to view but not edit the dashboards 130. In yet another embodiment, access control can be configured to allow viewing and/or editing of only a portion of the displayed information on the individual dashboards 130. In further embodiments, access control can be configured to allow other suitable types of restriction or permission related to one or more of the published dashboards 130.

In other embodiments, the first user 101a can publish the one or more dashboards 130 as integral parts of one or more deployment packages (not shown) having associated cloud-based applications and/or services. The dashboards 130 included in the deployment packages can be pre-configured to monitor and present information associated with the applications and/or services included in the deployment package. As such, by sharing the dashboards 130 with administrators, developers, or other suitable users 101, operational data related to the deployed applications and/or services can be efficiently conveyed.

In further embodiments, the one or more dashboards 130 can be individually associated with a tag, flag, descriptor, classifier, or other suitable types of metadata. For example, one or more dashboards 130 can be associated with a tag, e.g., "human resources." As such, when an user 101 selects the tag "human resources," the computing system 100 can present the one or more dashboards 130 identified by this tag to the user 101. In certain embodiments, the first user 101a can assign a tag to the dashboards 130 during publication. In other embodiments, the dashboard services 118 can be configured to assign a suitable tag based on, for instance, information displayed in the dashboards 130. In further embodiments, an administrator or other suitable entities can assign a suitable tag to the individual dashboards 130.

In certain embodiments, the dashboard services 118 can provide an editor or other suitable facilities to the first user 101a to create or configure the dashboard 130. In other embodiments, the first user 101a can publish, modify, or otherwise manipulate the dashboards 130 programmably without accessing the portal 112. For example, as shown in FIG. 2A, the first user 101a can create files of the dashboards 130 and directly publish the dashboards 130 to the resource manager 116. In response, the resource manager 116 associate the received dashboards 130 with the dashboard services 118 and store the received dashboards 130 in the resource controller 126 or other suitable locations. As such, the first user 101a can utilize external programming applications (e.g., Microsoft Visual Studio®) to develop or configure a dashboard 130 and publish the configured dashboard 130 directly to the cloud computing system 100. External programming applications can also allow the first user 101a to revise or modify the published dashboards 130 programmably subsequent to publication.

In operation, the first user 101a can log into the portal 112 with suitable user credentials. In response, the resource manager 116 can provide dashboard services 118, virtual machine services 120, storage services 122, or other suitable services to the first user 101a. In one embodiment, the first user 101a can then create or configure one or more dashboards 130 using the dashboard services 118. The first user 101a can then publish the dashboards 130 with or without access controls. In response, the dashboard services 118 can store and allow access to the published dashboards 130, as described in more detail below with reference to FIG. 2B.

Figure 2B:
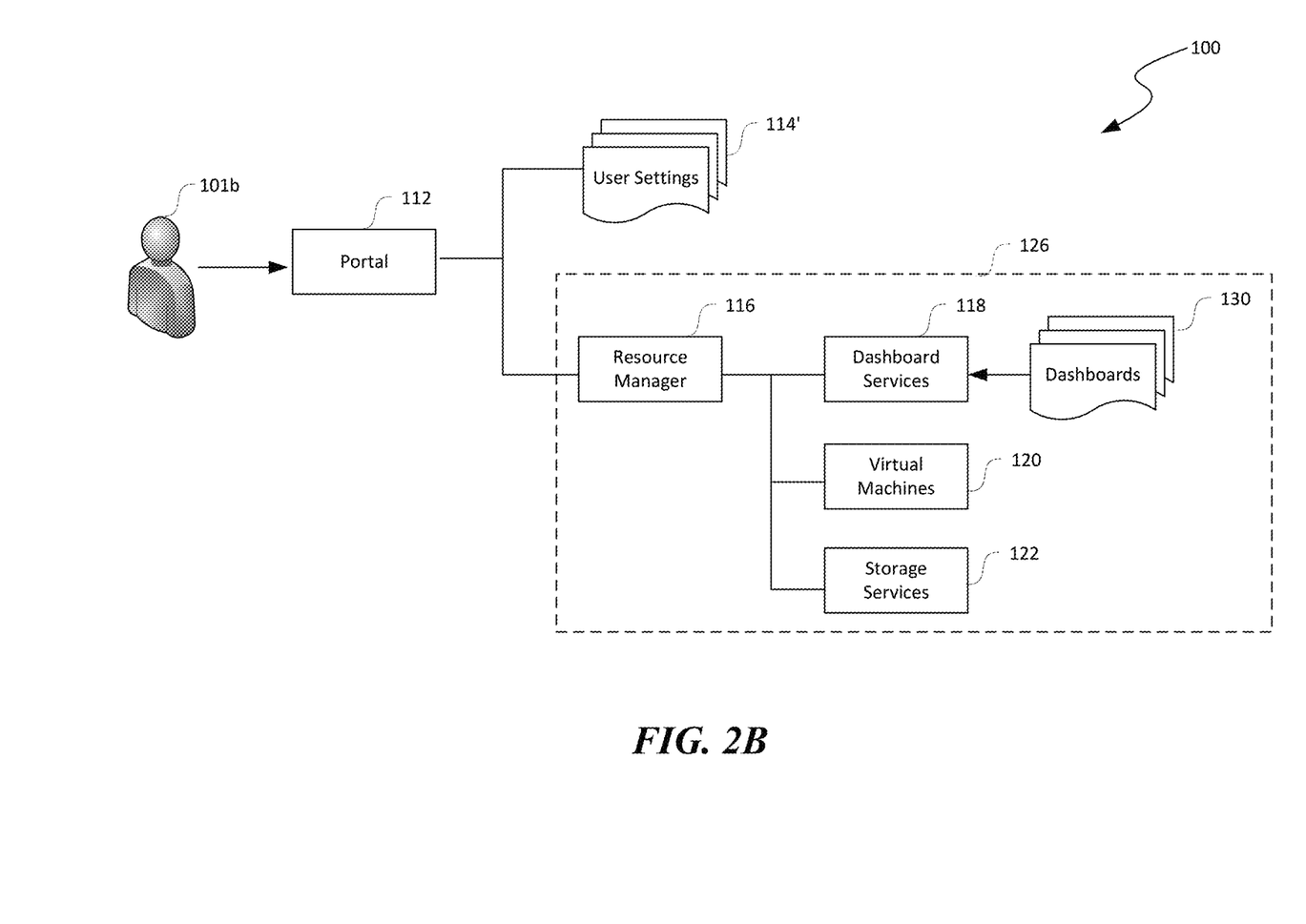
FIG. 2B is a schematic diagram showing example software components of the computing system in FIG. 1 during sharing of a dashboard in accordance with embodiments of the disclosed technology.

FIG. 2B is a schematic diagram showing example software components of the computing system 100 in FIG. 1 during sharing of a dashboard 130 in accordance with embodiments of the disclosed technology. As shown in FIG. 2B, a second user 101b can log into the portal 112 to access associated user settings 114'. Upon authentication, the resource manager 116 can also be configured to provide a list of published dashboards 130 to the second user 101b based on, for instance, service subscriptions, an access level, or other profiles of the second user 101b. The second user 101b can then select one or more of the published dashboards 130 to edit, view, or otherwise interact with. In response, the resource manager 116 can cause the selected dashboard 130 be displayed to the second user 101b. In further embodiments, the second user 101b can provide an input to the displayed dashboard 130 requesting a particular action and/or data. In response, the resource manager 116 (or the dashboard services 118) can determine whether the second user 101b is permitted for the requested action and/or data. If the determination is positive, the resource manager 116 can permit the dashboard services 118 to perform the requested action or provide the requested data. Otherwise, the resource manager 116 can deny the requested action and/or refuse the provide the requested data.

Several embodiments of the computing system 100 described above with reference to FIGS. 1-2B can allow efficient cooperation among administrators, developers, users, or other suitable entities by sharing published dashboards 130. For example, unlike in conventional systems in which dashboards are private to corresponding users, several embodiments of the computing system 100 allows a user 101 to create and publish a dashboard 130. Other users 101 can then further develop the published dashboard 130 with additional information, graphics, or other suitable components.

In other embodiments, the published dashboards 130 can also receive unattended upgrades. For example, the first user 101a (FIG. 2A) can publish a dashboard 130 and shares the dashboard 130 with the second user 101b (FIG. 2B), who is allowed to view but not edit the published dashboard 130. After publication, the first user 101a can revise or modify the published dashboard 130, for example, by organizing displayed information. Once the first user 101a accepts all the revisions, the computing system 100 can automatically upgrade the published dashboard 130 to the new version with all the revisions by the first user 101a without any input from the second user 101b. As such, the second user 101b can access the upgraded dashboard 130 without any effort to upgrade by the second user 101b.

Figure 3A:
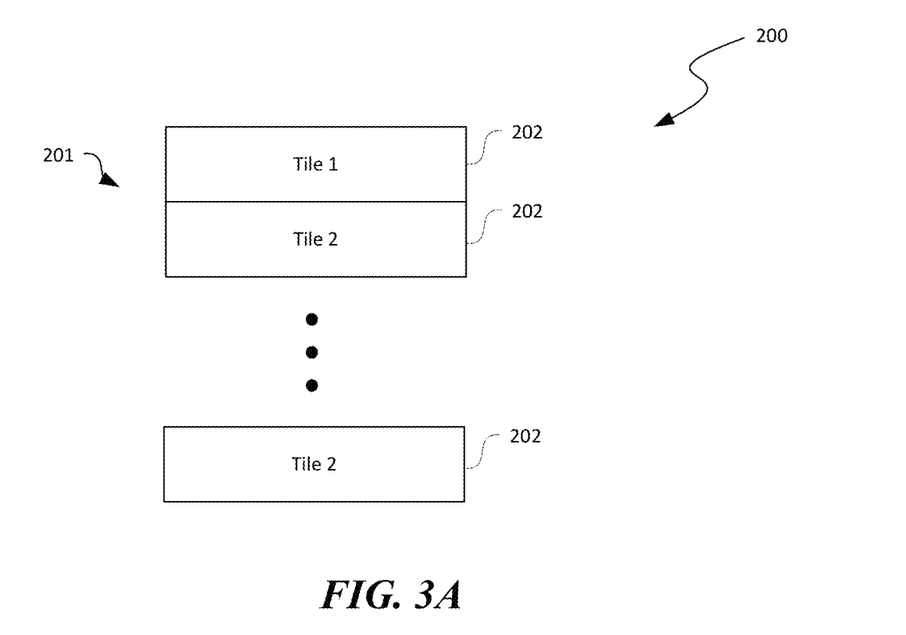
FIG. 3A is a schematic diagram showing components of an example dashboard file in accordance with embodiments of the disclosed technology.
Figure 3B:
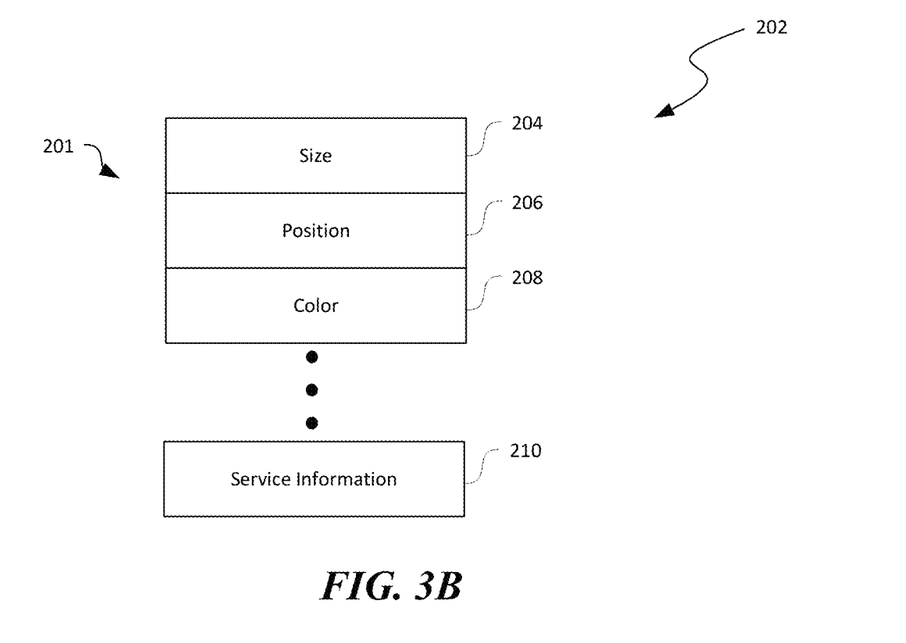
FIG. 3B is a schematic diagram showing components of a tile in FIG. 3A in accordance with embodiments of the disclosed technology.

FIGS. 3A and 3B are schematic diagrams showing components of an example dashboard file in accordance with embodiments of the disclosed technology. As shown in FIG. 3A, the dashboard file 200 can include a plurality of GUI element fields 201. In the illustrated embodiment, tiles are used as examples of such GUI elements. In other embodiments, the GUI elements can also include tables, graphs, or other suitable graphical components. As shown in FIG. 3B, each tile field 202 can include definition of various characteristics of displayed information. For example, each tile field 202 can include fields such as size 204, position 206, color 208, and service information 210 displayed in the tile. In other embodiments, the tile field 202 can also include fonts, font size, update frequency of the service information, and/or other suitable information.

Figure 3C:
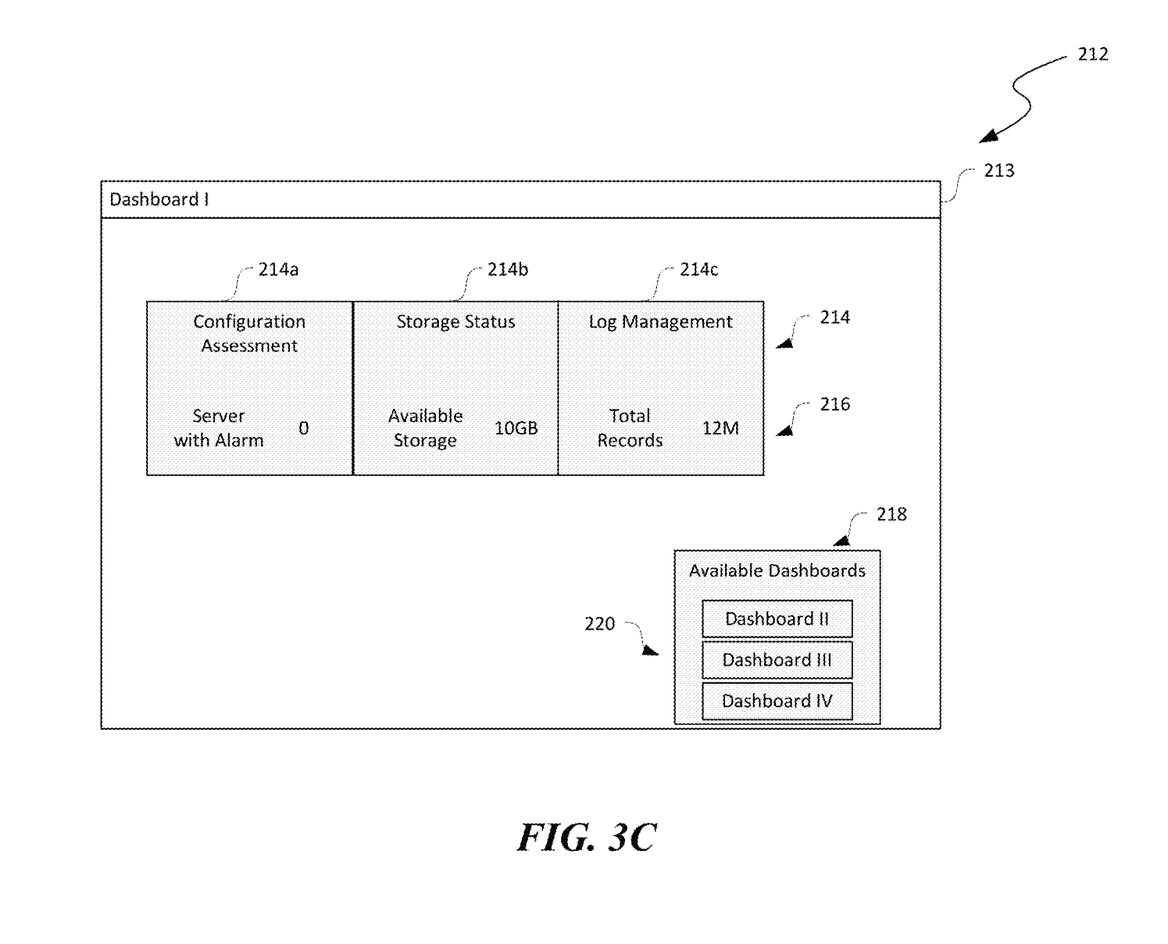
FIG. 3C is an example user interface of a dashboard in accordance with embodiments of the disclosed technology.

FIG. 3C is an example user interface 212 of a dashboard in accordance with embodiments of the disclosed technology. As shown in FIG. 3C, the user interface 212 includes a title bar 213 identifying the dashboard, i.e., "Dashboard I" shown as an illustrative example. The user interface 212 can also include one or more graphical user interface elements 214. In the illustrated embodiment, the graphical user interface elements are shown as first, second, and third tiles 214a-214c. In other embodiments, the user interface 212 can also include tables, graphs, or other suitable interface elements.

As shown in FIG. 3C, the individual tiles 124a-124c can each include a description, for example, "Configuration Assessment," "Storage Status," and "Log Management." Each of the tiles 124a-124c can also include one or more data fields 216 displaying status, operating conditions, or other suitable data. For example, as shown in FIG. 3C, the "Server with Alarm" field can show a number of servers with alarms. The "Available Storage" field can show available amount of storage space, i.e., 10 GB in FIG. 3C. The "Log Management" field can show a total number of log records, i.e., 12 M in FIG. 3C.

The user interface 212 can also include a control tile 218 configured to allow a user to select another dashboard from a list of dashboards. For example, as shown in FIG. 3C, the control tile 218 can include one or more buttons 220 (three are shown for illustration purposes) that allow a user to select one of "Dashboard II," "Dashboard III," or "Dashboard IV." In other embodiments, the control tile 218 can also include a list or other suitable collection of available dashboards for user selection.

Figure 4:
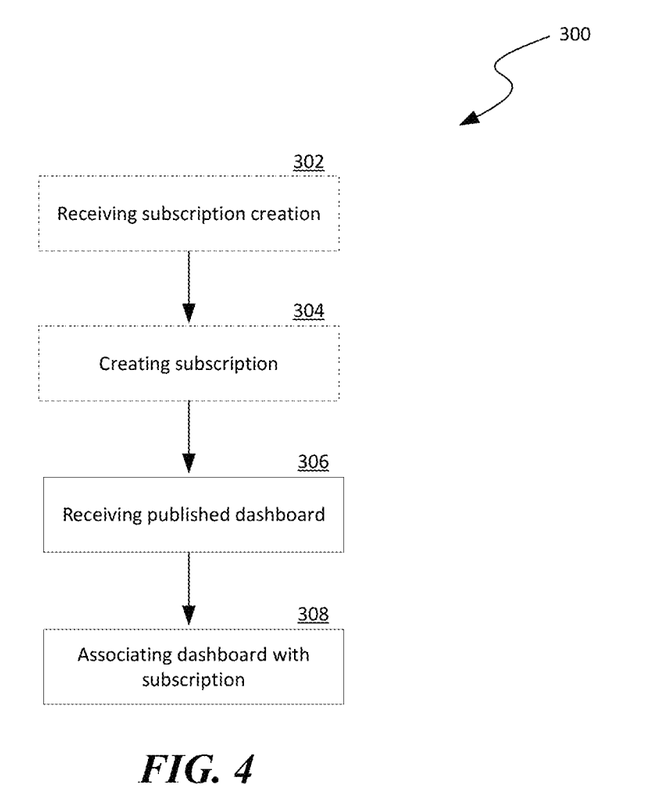
FIG. 4 is a flowchart of associating a dashboard with a cloud-based subscription in accordance with embodiments of the disclosed technology.

FIG. 4 is a flowchart of a process 300 for associating a dashboard with a cloud-based subscription in accordance with embodiments of the disclosed technology. As shown in FIG. 4, the process 300 can include an optional operation of receiving a request to create a subscription, for example, from the first user 101a (FIG. 2A) via the portal 112 (FIG. 2A) at stage 302. In response, the process 300 includes another optional operation of creating the requested subscription at stage 304, after checking user credentials or permissions. The optional operations at stages 302 and 304 are shown in phantom lines in FIG. 4 for clarity. The process 300 can then include receiving a file associated with a published dashboard at stage 306, either via the portal 112 or directly to the resource manager 116 (FIG. 2A). In response, the process 300 can include storing the received dashboard 130 and associating the stored dashboard 130 to the created subscription. In certain embodiments, associating the dashboard 130 can also include determining sharing information associated with the published dashboard. For example, the process 300 can include identifying the publisher of the dashboard, one or more administrators of the dashboard, one or more users of the dashboard, or other permitted entities. In other embodiments, the process 300 can include storing the sharing information as metadata with the stored dashboard. In further embodiments, the optional operations at stages 302 and 304 may be omitted, and the received file associated with a published dashboard at stage 306 can be associated with one or more existing subscriptions, for example, previously created by the first user 101a.

Figure 5A:
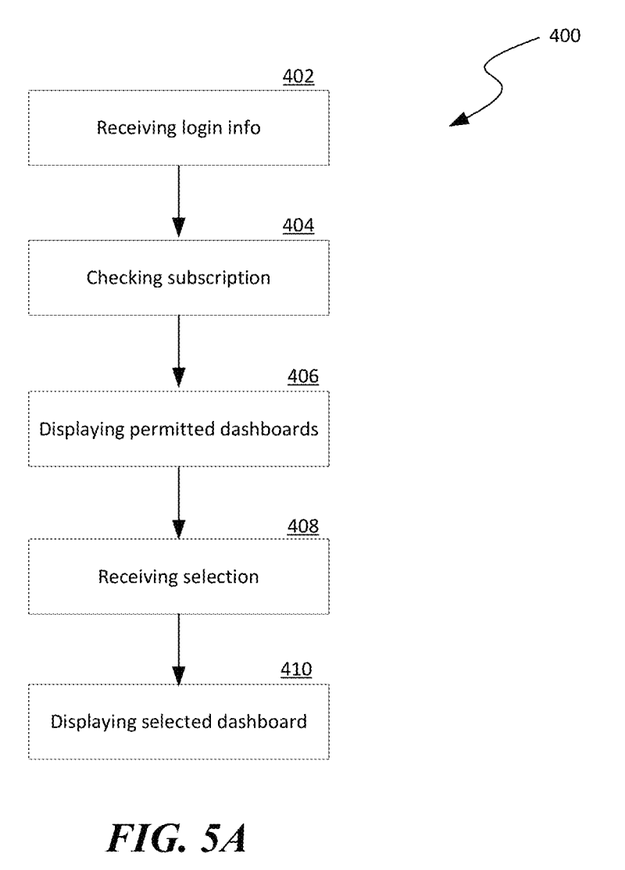
FIG. 5A is a flowchart of displaying one or more selected dashboards in accordance with embodiments of the disclosed technology.

FIG. 5A is a flowchart of a process 400 for displaying one or more selected dashboards in accordance with embodiments of the disclosed technology. As shown in FIG. 5A, the process 400 can include receiving login information from a user (e.g., the second user 101b of FIG. 2B) at stage 402. In response, the process 400 can include checking subscription information associated with the user at stage 404. Based on the determined subscription information, the process 400 can include displaying permitted dashboard such as those published by the user or shared with the user by other users (e.g., the first user 101a of FIG. 2A), at stage 406. The process 400 can then include receiving a selection of one or more of the displayed dashboard from the user at stage 408. The process 400 can then include displaying the selected one or more dashboards at stage 410.

Figure 5B:
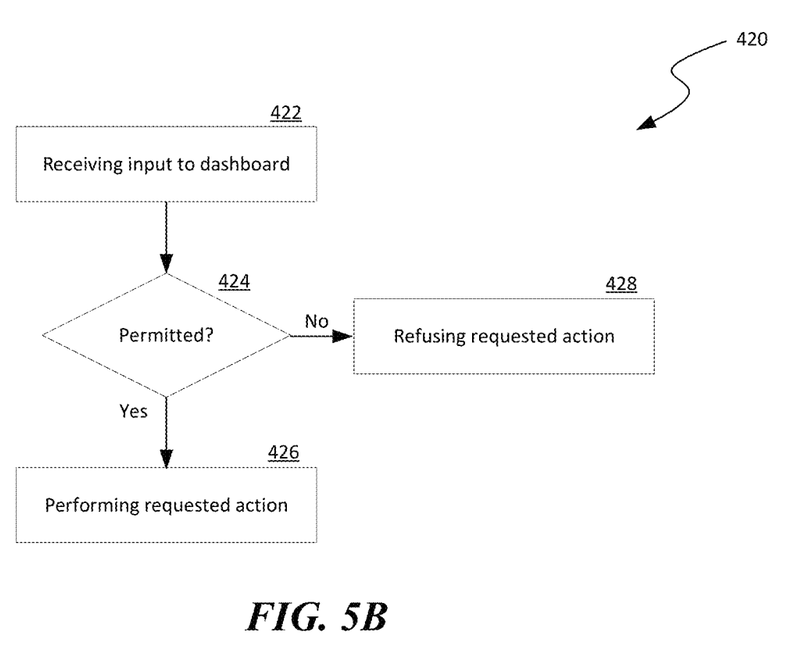
FIG. 5B is a flowchart of enforcing access control on a displayed dashboard in accordance with embodiments of the disclosed technology.

FIG. 5B is a flowchart of a process 420 for enforcing access control on a displayed dashboard in accordance with embodiments of the disclosed technology. As shown in FIG. 5B, the process 420 can include receiving an input from a user (e.g., the second user 101b of FIG. 2B) to a displayed dashboard at stage 422. The received input can request an action or data via the dashboard. The process 420 can then include determining whether the user is permitted to perform the requested action or receive the requested data at stage 424, for example, based on access controls by the resource manager 116 (FIG. 2A) and/or other dashboard services 118 (FIG. 2A). If the user is permitted, the process 420 can include performing the requested action or provide the requested data at stage 426. Otherwise, the process 420 can include refusing the requested action or provide the requested data at stage 428.

Figure 6:
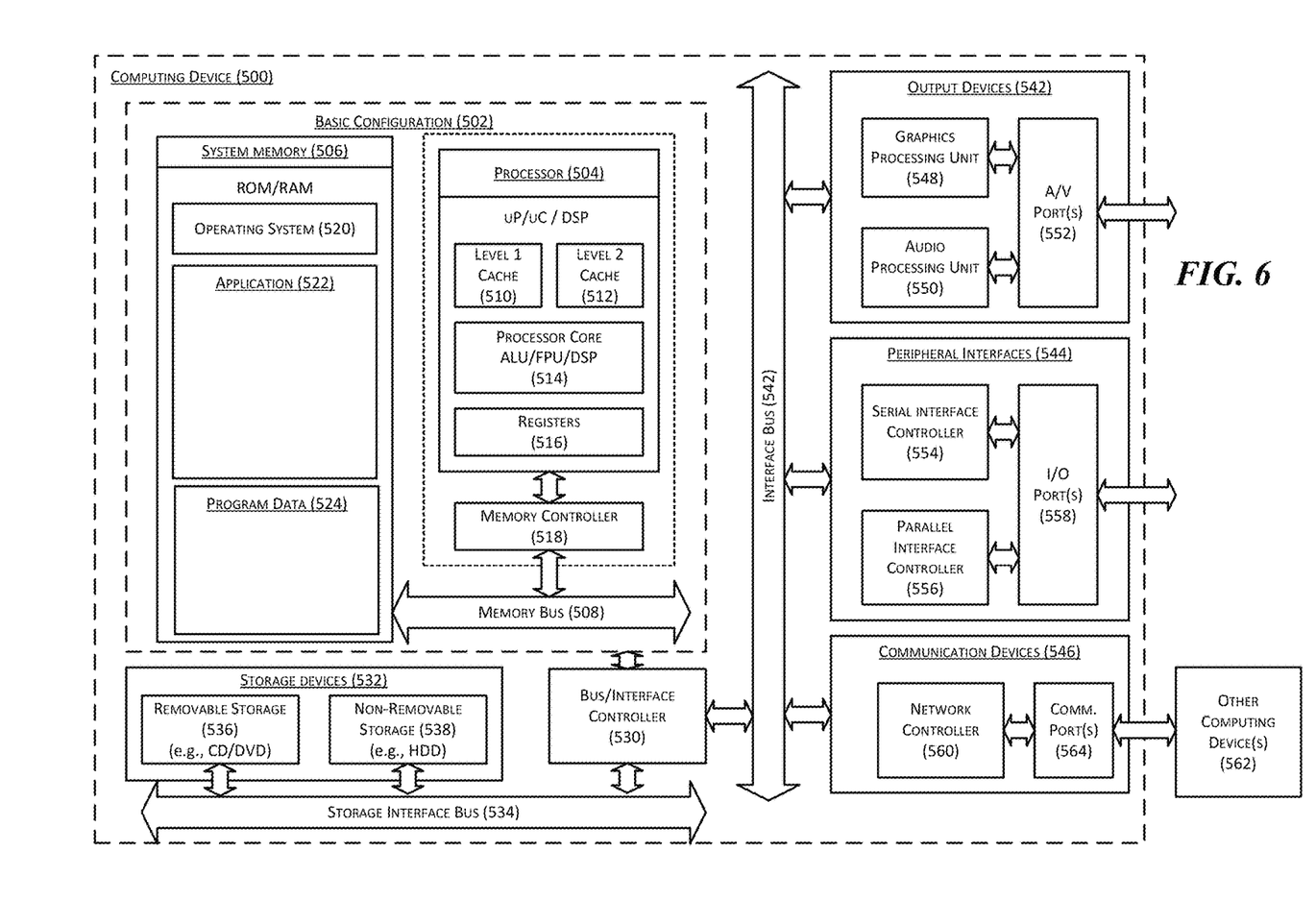
FIG. 6 is a computing device suitable for certain components of the computing system in FIG. 1.

FIG. 6 is a computing device 500 suitable for certain components of the computing system in FIG. 1. For example, the computing device 500 may be suitable for implementing one or more of the portal 112, the resource manager 116, the dashboard services 118, the virtual machines 120, or the storage services 122 of FIG. 2A or 2B. In a very basic configuration 502, computing device 500 typically includes one or more processors 504 and a system memory 506. A memory bus 508 may be used for communicating between processor 504 and system memory 506.

Depending on the desired configuration, the processor 504 may be of any type including but not limited to a microprocessor (µP), a microcontroller (µC), a digital signal processor (DSP), or any combination thereof. The processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, the system memory 506 may be of any type including but not limited to volatile memory (such as RAM), non-volatile memory (such as ROM, flash memory, etc.) or any combination thereof. The system memory 506 can include an operating system 520, one or more applications 522, and program data 524. This described basic configuration 502 is illustrated in FIG. 6 by those components within the inner dashed line.

The computing device 500 may have additional features or functionality, and additional interfaces to facilitate communications between basic configuration 502 and any other devices and interfaces. For example, a bus/interface controller 530 may be used to facilitate communications between the basic configuration 502 and one or more data storage devices 532 via a storage interface bus 534. The data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, removable storage devices 536, and non-removable storage devices 538 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 500. Any such computer readable storage media may be a part of computing device 500. The term "computer readable storage medium" excludes propagated signals and communication media.

The computing device 500 may also include an interface bus 540 for facilitating communication from various interface devices (e.g., output devices 542, peripheral interfaces 544, and communication devices 546) to the basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 500 may also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for providing a computer dashboard as a cloud-based service in a cloud computing system, comprising:
  receiving a dashboard file at a server via a computer network, processing of the dashboard file at the server providing a cloud-based dashboard service that collects and assembles operating conditions of a plurality of cloud-based services deployed in the cloud computing system, wherein the dashboard file identifies a dashboard having one or more graphical user interface elements individually configured to display and dynamically update data of the collected and assembled operating conditions of the plurality of cloud-based services, wherein the dashboard file further contains metadata indicating a cloud-based subscription corresponding to the cloud-based dashboard service and two or more entities allowed to access the dashboard and edit the dashboard file;
  associating the received dashboard file with the corresponding cloud-based subscription;
  identifying the two or more entities based on the cloud-based subscription;
  displaying, via the computer network, the cloud-based dashboard service identified by the dashboard file to the two or more entities upon verification of the cloud-based subscription, the cloud-based dashboard service having the one or more graphical user interface elements individually displaying and dynamically updating data of the collected and assembled operating conditions of the plurality of cloud-based services included in the cloud-based subscription; and
  accepting one or more revisions from one of the two or more entities allowed to access the dashboard and edit the dashboard file, and updating the dashboard file with the accepted one or more revisions.

2. The method of claim 1, further comprising:
  receiving, from the one of the two or more entities, an input to the displayed dashboard at the server, the input requesting an action or data associated with a corresponding cloud-based service;
  determining whether the one of the two or more entities has permission for the requested action or data; and
  in response to determining that the one of the two or more entities has permission, allowing performance of the requested action or providing the requested data.

3. The method of claim 1 wherein receiving the dashboard file includes receiving the dashboard file at a resource manager associated with the cloud computing system via a portal of the cloud computing system.

4. The method of claim 1 wherein receiving the dashboard file includes bypassing a portal of the cloud computing system and receiving the dashboard file directly at a resource manager associated with the cloud computing system.

5. The method of claim 1 wherein receiving the dashboard file includes receiving the dashboard file in a package having one or more cloud-based applications or services.

6. The method of claim 1, further comprising:
  receiving a revision to the received dashboard file; and
  wherein displaying the dashboard includes displaying the dashboard based on the received revision to the dashboard file without actions from the two or more entities.

7. The method of claim 1 wherein:
  the metadata also indicate an allowed portion of the graphical user interface elements associated with an individual one of the two or more entities; and
  displaying the dashboard includes displaying the dashboard having only the allowed portion of the graphical user interface elements associated with the individual one of the two or more entities.

8. The method of claim 1 wherein:
  the metadata also indicate that the dashboard file is associated with a classifier; and
  the method further includes:
    receiving a user input containing the classifier; and
    in response to the received user input, displaying the dashboard associated with the classifier.

9. A computer system implementing a computer dashboard as a cloud-based service in a cloud computing system, the computer system comprising:

a processor and a memory containing instructions executable by the processor to cause the computer system to perform a process comprising:

receiving a dashboard file, processing of the dashboard file by the processor providing a cloud-based dashboard service that collects and assembles operating conditions of a plurality of cloud-based services deployed in the cloud computing system, wherein the dashboard file identifying a dashboard having one or more graphical user interface elements individually configured to display data of the collected and assembled operating conditions of the plurality of cloud-based services, wherein the dashboard file further contains metadata indicating two or more entities allowed to access the dashboard and edit the dashboard file, and a cloud-based subscription corresponding to the cloud-based dashboard service;

identifying the two or more entities based on the cloud-based subscription indicated in the metadata;

displaying the cloud-based dashboard service identified by the dashboard file to the two or more entities upon verification of entity identification based on the cloud-based subscription in the metadata, the cloud-based dashboard service having the one or more graphical user interface elements individually displaying data of the collected and assembled operating conditions of the plurality of cloud-based services corresponding to the two or more entities; and accepting one or more revisions from one of the two or more entities allowed to access the dashboard and edit the dashboard file, and updating the dashboard file with the accepted one or more revisions.

10. The computer system of claim 9 wherein the process performed by the processor further includes:

receiving, from the one of the two or more entities, an input to the displayed dashboard, the input requesting an action or data associated with a corresponding cloud-based service;

determining whether the one of the two or more entities has permission for the requested action or data; and in response to determining that the one of the two or more entities has permission, allowing performance of the requested action or providing the requested data.

11. The computer system of claim 9 wherein receiving the dashboard file includes receiving the dashboard file via a portal of the cloud computing system.

12. The computer system of claim 9 wherein receiving the dashboard file includes bypassing a portal of the cloud computing system and receiving the dashboard file directly at a resource manager associated with the cloud computing system.

13. The computer system of claim 9 wherein receiving the dashboard file includes receiving the dashboard file in a package having one or more cloud-based applications or services.

14. The computer system of claim 9 wherein: the process performed by the processor further includes:

receiving a revision to the received dashboard file; and wherein displaying the dashboard includes displaying the dashboard based on the received revision to the dashboard file without actions from the two or more entities.

15. A computer readable storage medium containing instructions executable by the processor to cause a server in a cloud computing system to perform a process comprising:

receiving a request to access a dashboard file, processing of the dashboard file at the server providing a cloud-based dashboard service that collects and assembles operating conditions of a plurality of cloud-based services deployed in the cloud computing system, wherein the dashboard file identifying a dashboard having one or more graphical user interface elements individually configured to display data of the collected and assembled operating conditions of the plurality of cloud-based services, wherein the dashboard file further contains metadata indicating two or more entities allowed to access the dashboard and edit the dashboard file, and a cloud-based subscription corresponding to the cloud-based dashboard service;

determining whether the received request is from the two or more entities based on the cloud-based subscription indicated in the metadata of the dashboard file;

in response to determining that the received request is from the two or more entities based on the cloud-based subscription indicated in the metadata of the dashboard file, displaying the cloud-based dashboard service identified by the dashboard file to the two or more entities, the cloud-based dashboard service having the one or more graphical user interface elements individually displaying data of the collected and assembled operating conditions of the plurality of cloud-based services corresponding to the two or more entities; and accepting one or more revisions from one of the two or more entities allowed to access the dashboard and edit the dashboard file, and updating the dashboard file with the accepted one or more revisions.

16. The computer readable storage medium of claim 15 wherein the process performed by the processor further includes:

receiving, from the one of the two or more entities, an input to the displayed dashboard, the input requesting an action or data associated with a corresponding cloud-based service;

determining whether the one of the two or more entities has permission for the requested action or data; and in response to determining that the one of the two or more entities has permission, allowing performance of the requested action or providing the requested data.

17. The computer readable storage medium of claim 15 wherein receiving the dashboard file includes receiving the dashboard file in a package having one or more cloud-based applications or services.

18. The computer readable storage medium of claim 15 wherein the process performed by the processor further includes:

receiving a revision to the received dashboard file; and wherein displaying the dashboard includes displaying the dashboard based on the received revision to the dashboard file without actions from the two or more entities.

19. The computer readable storage medium of claim 15 wherein:

the metadata also indicate an allowed portion of the graphical user interface elements associated with an individual one of the two or more entities; and displaying the dashboard includes displaying the dashboard having only the allowed portion of the graphical user interface elements associated with the individual one of the two or more entities.

* * * * *